J. GLINKA.
TRACTOR ATTACHMENT FOR MOTOR VEHICLES.
APPLICATION FILED NOV. 21, 1918.
1,319,998.
Patented Oct. 28, 1919.
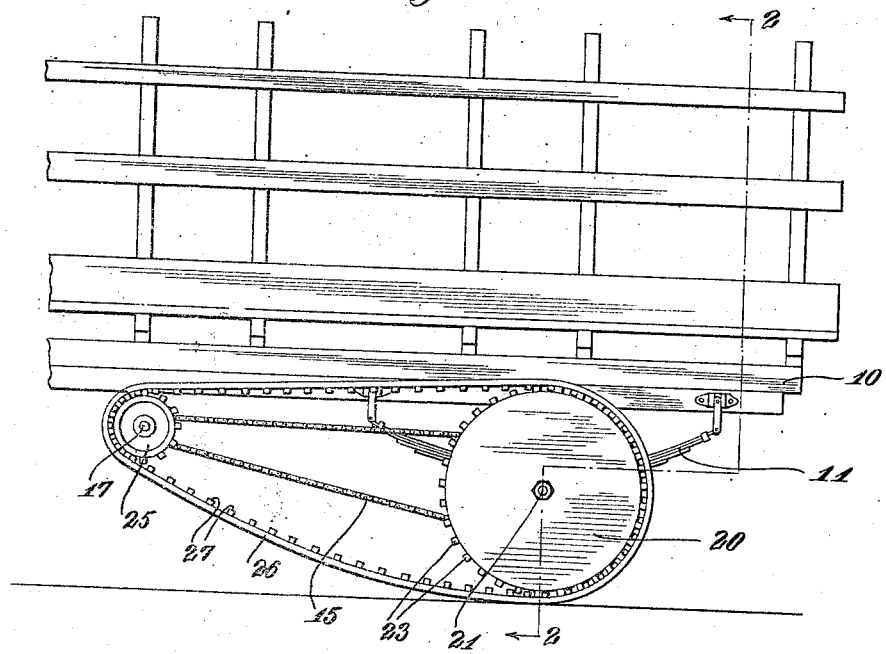
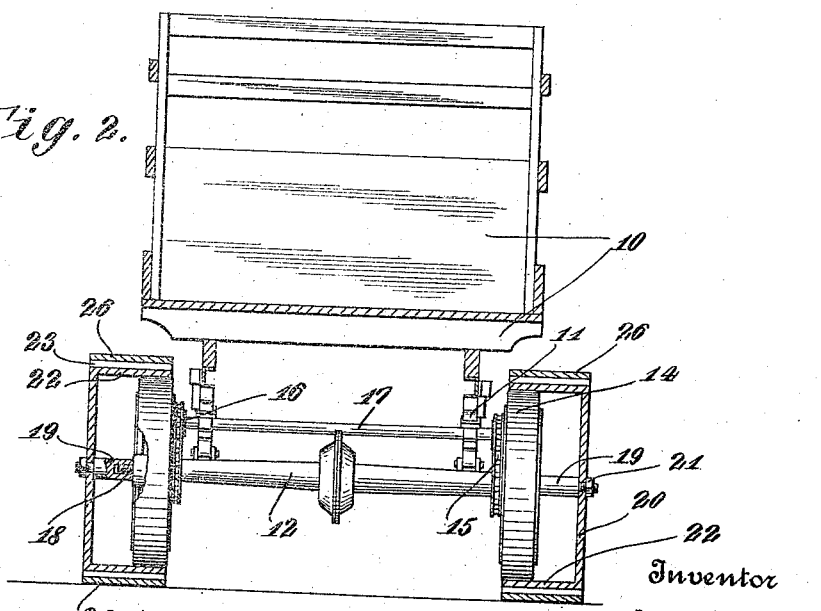
Inventor
John Glinka.
By his Attorney

UNITED STATES PATENT OFFICE.

JOHN GLINKA, OF WILSON, PENNSYLVANIA.

TRACTOR ATTACHMENT FOR MOTOR-VEHICLES.

1,319,998.  Specification of Letters Patent.  Patented Oct. 28, 1919.

Application filed November 21, 1918. Serial No. 263,475.

*To all whom it may concern:*

Be it known that I, JOHN GLINKA, a citizen of Russia, residing at Wilson, county of Allegheny, and State of Pennsylvania, have invented certain new and useful Improvements in Tractor Attachment for Motor-Vehicles, of which the following is a specification.

This invention relates to improvements in tractive devices as applied to the wheels of motor vehicles, and has as its principal object the provision of means whereby the tractive effect of the driving wheels is materially increased, the same being particularly useful on muddy snow covered surfaces.

A further object is to provide such means in forms which may be applied to vehicles without material change therein.

These and other like objects are attained by the novel construction and combination of parts hereinafter described, and shown in the accompanying drawings, forming a material part of this disclosure, and in which—

Figure 1 is a fragmentary side elevational view showing a conventional type of vehicle and indicating the application of the invention, and Fig. 2 is a vertical sectional view taken on line 2—2 of Fig. 1.

Referring to the drawings, a conventional type of motor truck is designated by the numeral 10, the same resting upon springs 11 at the rear, supported upon an axle 12 carried on the wheels 14 of the usual type of construction and driven by chains 15 in the ordinary manner.

These chains are trained over sprockets 16 mounted upon the driving shaft 17, parallel with and in advance of the axle 12.

In order to carry out the invention, the ends of the shaft 12 are screw threaded, as at 14, and fitted to the extending ends are stubs 19, upon the outer ends of which are mounted disks 20, the same being held in position by the nuts 21 and formed with the disks 20 are rigid cylindrical elements 22, having transverse teeth 23 upon their periphery, forming in effect a specialized type of spur gear, the inner diameter of the cylinders 20 being fitted closely to the tires of the wheel 14.

Similarly, the shaft 17 is extended at its ends and in addition to the driving sprockets 16, has secured upon its outer extremities, spur gears 25 over which are trained flexible bands 26 having rigidly engaged upon their inner surfaces a plurality of teeth 27 adapted to mesh with the teeth of the teeth 23 of the cylinders 22, and also the driving gears 25.

The length of the bands 26 is such as to form a loose bight in front of the driving wheels and which are so proportioned with reference to the proportions of the gears 25 and 22 that the extra length of the band is always displayed in front of the wheel thus providing a tractor effect, something in the manner of a caterpillar drive, which is increased due to the extra width of the band, the width being substantially double that of the driving wheels.

From the foregoing it will be seen that an effective driving device has been disclosed, especially efficient on slippery, wet or irregular surfaces, completely preventing the skidding of the rear wheels and propelling the vehicle forward irrespective of the surface conditions.

Having thus described my invention what I claim as new and desire to secure by Letters Patent is—

1. In a device of the class described, the combination with a drive shaft, a vehicle axle, wheels mounted on said axle and chain connections between said drive shaft and said vehicle axle, of extensions removably secured at the end of said axle, other extensions applied to the ends of said drive shaft, spur-gears fixed upon said drive shaft, hollow gears removably secured on the periphery of said drive wheels, means for securing said hollow gears to said extensions, a flexible belt extending over said hollow gears to said spur gears, and a plurality of teeth formed in the inner side of said flexible belt engageable with the teeth of said gears respectively.

2. In a device of the class described, the combination with a vehicle having a drive shaft and a driven axle, of spur-gears removably secured upon said drive shaft, other gears on the wheels of said axle, said spur-gears on said drive-shaft extending laterally outward therebeyond, a flexible belt trained over said gears; said belt having teeth engageable with the teeth of said gears, and means for connecting said gears respectively to said drive shaft and to said wheels.

3. In a device of the class described, the combination with the driving wheels of a vehicle, and a driving shaft thereof, of gears removably secured upon the periphery of said driving wheels extending laterally therebeyond, driving gears extending from the end of said drive shaft, and flexible belts having teeth elements, removably trained over said gears, said belt elements being driven by said driving shaft and driving said wheels so as to present a relatively tight upper surface, and a lax lower surface disposed in advance of said driving wheels.

In testimony whereof I have affixed my signature.

JOHN GLINKA.